June 5, 1934.                R. BUYDTS                1,962,052
                        CHERRY STEMMING MACHINE
                         Filed March 17, 1933

Inventor:
R. Buydts

Patented June 5, 1934

1,962,052

UNITED STATES PATENT OFFICE 1,962,052

CHERRY STEMMING MACHINE

René Buydts, Brussels, Belgium

Application March 17, 1933, Serial No. 661,393
In Belgium May 18, 1932

7 Claims. (Cl. 146—55)

This invention concerns an automatic machine for plucking cherry-stems, and it has for its object to provide a machine of this kind which will be adapted to operate continuously at a very high output of stemmed cherries per unit of time, and without appreciable waste.

In my improved machine a drum carrying the cherries with their stems extending outwardly, is caused to rotate tangentially to a pair of inversely rotating rollers whereby the cherry stems are plucked out, while the cherries are held by means of guiding members arranged circumferentially around the rotatable drum. Preferably, the cherries are fed to the drum upon an inclined endless conveyor having a nail-studded surface. The nails projecting from the surface of said inclined endless conveyor are adapted to retain clusters of cherries and to carry the same beneath a rotating brush, the cherries being detached from the clusters thereby and rolling down the conveyor into the cells formed in the periphery of the drum to receive them.

This preliminary separation of the fruit into loose cherries causes the latter to fall upon the rotating drum, into cells provided in the periphery thereof, where they are distributed by means of a rotating brush. To give the plucking rollers a good grip of the cherry stems, a second rotating brush is provided, adapted to raise the stems of the same radially before they come into engagement with said rollers.

As will appear from the following detailed description illustrated, by way of example, in the accompanying drawing, a cherry stemming machine embodying the principles of my invention may be constructed in a simple and practical manner. In said drawing.

Figure 2:
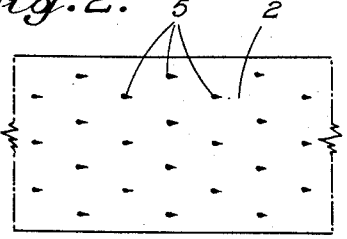
Fig. 2 is a plan view of a portion of the endless conveyor.

The cherries to be stemmed are fed into the machine through a chute 1 discharging upon an inclined, endless conveyor 2 travelling upwardly around pulleys 3, of which one may be suitably driven. Loose cherries roll down the conveyor 2 into a hopper 4, whilst clusters of cherries remaining suspended from nails 5 studding the conveyor are carried by the same under a revolving brush 6, mounted at the upper portion thereof. Brush 6 rotates inversely to the direction of travel of conveyor 2, and thereby breaks up the clusters of cherries. Some loose cherries, detached from or still carrying their stem, roll down the conveyor 2 into the hopper 4. Clusters of cherries which the revolving brush 6 has failed to break up slide down the conveyor, are caught by the nails 5 and are returned thereby beneath brush 6. Stems plucked out by said nails drop into a container 6a, fitted behind brush 6. Preferably, the nails are arranged in staggered relationship as shown on Fig. 2, in order better to adapt them to intercept the clusters of cherries, and they are slightly bent forward so that they may hook said clusters securely when ascending the conveyor.

The bottom of the hopper 4 is closed by a drum 7 comprising, in the example illustrated, three circumferential rows of cells 8. The diameter and depth of the cells are slightly greater than the diameter of the cherries, so that the latter may fall readily therein under their own weight and come to rest with the stem directed upwardly. The clockwise rotation of drum 7 causes the cherries contained in the cells to be carried beneath and past a brush 9, rotating clockwise also, adapted to retain any excess cherries in the hopper 4 and to distribute the same among the cells following.

Figure 1:
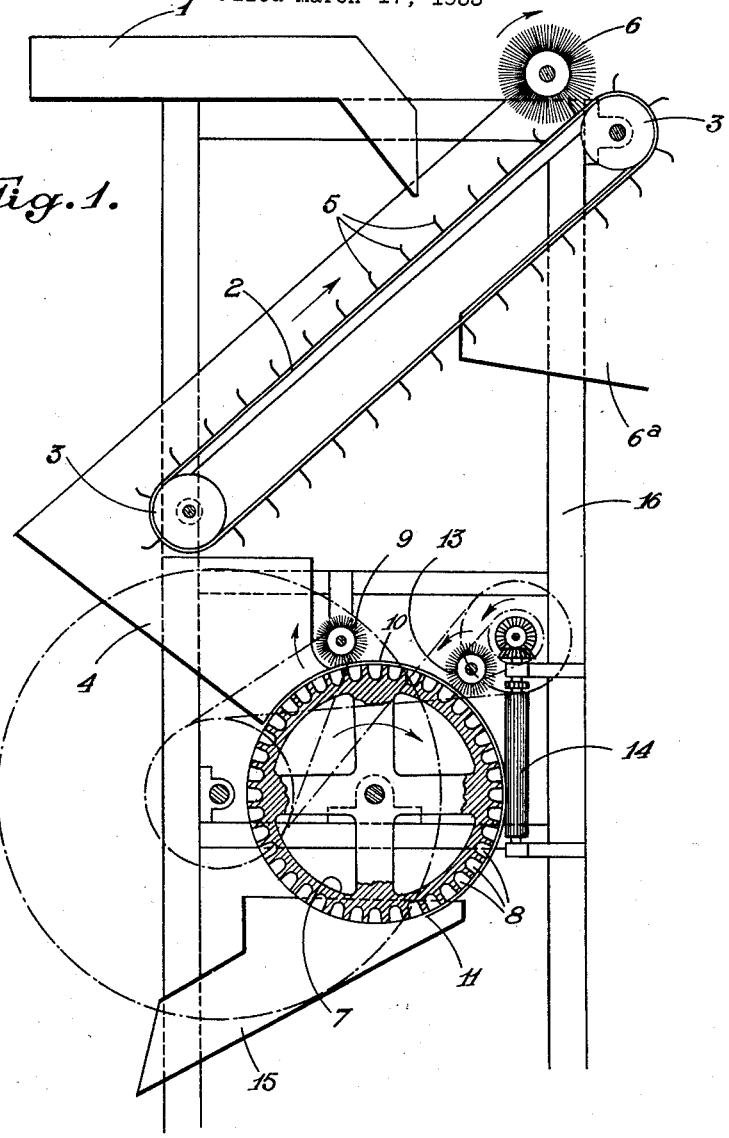
Fig. 1 is a diagrammatic vertical section of the complete machine.
Figure 3:
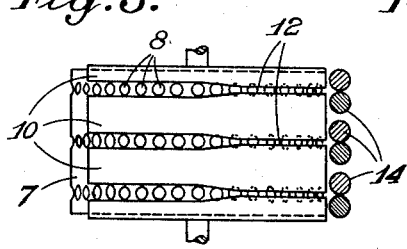
Fig. 3 is a top view of the drum showing the cells formed therein.

It will be seen from Figs. 1 and 3 that stationary sheet metal bands 10 having a curvature similar to that of the drum 7 surround a portion of the periphery of the same from hopper 4 to a point 11 substantially opposed thereto, said curved bands being arranged to cover the spaces between the adjacent rows of cells 8 and those extending from the outside rows of cells to the edges of the drum. Said sheet metal bands 10, constituting circumferential guiding members adapted to prevent the cherries from leaving the cells while their stems are plucked, become gradually wider beyond hopper 4, their edges progressively overlapping the rims of the cells, until only narrow slits 12 are left between them through which project the stems of the cherries contained in the cells and carried forward by the drum.

In passing under brush 9 the stems of the cherries may have become flattened somewhat and it is therefore desirable that they be caused to stand erect before reaching the plucking mechanism proper. For this purpose a second brush 9 is provided, rotating anti-clockwise.

Three pairs of vertical rollers 14, mounted to face the periphery of drum 4 and tangentially to the same, are so arranged that each pair of rollers faces a guiding slit 12. Hence, the stems guided in each said slit are caused to enter between and into engagement with the corresponding pair of rollers. The rollers of each pair being provided with longitudinal corrugations and being rotated inversely to each other seize the stems and pluck the same from the cherries, the latter being held in their cells 8 by the sheet-metal guides 10. When the stemmed cherries reach point 11, they drop from their cells into the discharge chute 15.

All the parts of the machine, together with the transmission and the driving unit actuating the same, are carried upon a bed-frame 16 illustrated diagrammatically in Fig. 1.

The constructional details of the machine, as herein described and illustrated by way of example, may of course be modified in various ways without departure from the scope of my invention, as defined by the appended claims.

I claim

1. A cherry stemming machine comprising in combination a conveyor, means on said conveyor for catching clusters of cherries, means co-operating with said conveyor for breaking up the clusters caught thereby, a revolving drum, means for feeding cherries from said conveyor onto said drum, means on said drum for picking up individual cherries, guides along said drum for engaging the cherries carried thereby, means for directing outwardly the stems of the cherries engaged by said guides, and pairs of rolls arranged tangentially of said drum for plucking the stems of the cherries engaged by said guides.

2. A cherry stemming machine comprising in combination a rotatable drum having in the periphery thereof a plurality of cells to contain each one cherry, inversely rotatable rolls arranged adjacently and tangentially to said periphery to pluck the stems from said cherries, curved guiding means partly surrounding said periphery adjacently thereto to guide said cherry stems towards said rolls, means causing said drum and rolls to rotate, and means for feeding cherries into said cells.

3. A cherry stemming machine comprising in combination a rotary drum having shallow cavities arranged in circumferential rows along its periphery, means for feeding cherries to the periphery of said drum and into said cavities, curved guide plates partly surrounding said drum, said plates being separated by gaps in alignment with said rows of cavities, said gaps narrowing gradually in the direction of rotation of said drum and terminating each in a narrow slit, means adjacent said guide plates for engaging the stems projecting through said slits and directing said stems outwardly, and pairs of short rolls arranged tangentially to the periphery of said drum for plucking said outwardly directed stems.

4. A cherry stemming machine comprising in combination a horizontal rotatable drum having a plurality of circumferential rows of cells in its periphery, each said cell being slightly larger than one cherry, means for feeding cherries to said cells, means causing said drum to rotate, a plurality of pairs of short longitudinally corrugated rolls arranged adjacently and tangentially to said periphery, the rolls of each said pair having their line of contact in the plane of one said row of cells, means causing the rolls of each pair of rolls to rotate inversely, and a plurality of lamellate curved guides arranged at one and other side of said peripheral rows of cells to guide said radially projecting cherry stems into engagement with said inversely rotating pairs of corrugated rolls.

5. In combination with a cherry stemming machine having the parts recited in claim 4, a cylindrical brush adjacent said drum and revolving in the same direction as said drum to distribute cherries fed thereto into said cells, and a second cylindrical brush adjacent said drum and arranged behind the first mentioned brush, said second brush rotating in reverse direction to said drum.

6. A cherry stemming machine comprising in combination an inclined endless conveyor, means causing said conveyor to travel upwardly, means for feeding cherries to said conveyor, nails on said conveyor for catching clusters of cherries, a rotary brush for breaking up the clusters caught by said nails, a hopper for receiving cherries from said conveyor, a rotary drum at the bottom of said hopper, said drum having a plurality of circumferential rows of shallow cells in its periphery, each cell being adapted to receive a cherry, means for rotating said drum, lamellate curved guides arranged at one and other side of said peripheral rows of cells, the gaps between adjacent guides narrowing gradually in the direction of rotation of said drum and terminating each in a narrow slit, a rotary brush for directing outwardly the cherry stems projecting through said gaps, and pairs of short rolls arranged tangentially to said drum for plucking the stems projecting through said slits.

7. A cherry stemming machine comprising in combination a hopper, a rotatable drum at the bottom of said hopper, a plurality of circumferential rows of cells in the periphery of said drum, means adjacent said drum for feeding cherries into said cells, curved plates arranged between said peripheral rows of cells, said curved plates extending from said hopper and partly surrounding said periphery adjacently thereto, means causing cherry stems to project radially between said plates, a plurality of pairs of short rolls arranged adjacently and tangentially to said periphery in proximity to the last mentioned means, each said pair of rolls facing one said row of cells, and means causing the rolls of each pair to rotate inversely.

RENÉ BUYDTS.